US007024458B2

United States Patent
Chan et al.

(10) Patent No.: US 7,024,458 B2
(45) Date of Patent: Apr. 4, 2006

(54) SYSTEM AND METHOD FOR MANAGING MAIL AND FILE

(75) Inventors: Yuan-Chau Chan, Taipei (TW); Mei-Chi Kuo, Taipei (TW)

(73) Assignee: Inventec Corporation, (TW)

( * ) Notice: Subject to any disclaimer, the term of this patent is extended or adjusted under 35 U.S.C. 154(b) by 724 days.

(21) Appl. No.: 10/060,557

(22) Filed: Jan. 30, 2002

(65) Prior Publication Data

US 2003/0145058 A1    Jul. 31, 2003

(51) Int. Cl.
*G06F 15/16* (2006.01)
*G06F 15/173* (2006.01)

(52) U.S. Cl. .................... 709/206; 709/204; 709/205; 709/207; 709/223; 709/203; 707/3; 707/7; 707/102

(58) Field of Classification Search ........ 709/200–207, 709/219–226, 239, 218; 707/1–10, 102; 370/260
See application file for complete search history.

(56) References Cited

U.S. PATENT DOCUMENTS

| | | | | |
|---|---|---|---|---|
| 6,023,723 A | * | 2/2000 | McCormick et al. | 709/206 |
| 6,073,142 A | * | 6/2000 | Geiger et al. | 715/500 |
| 6,092,101 A | * | 7/2000 | Birrell et al. | 709/206 |
| 6,161,130 A | * | 12/2000 | Horvitz et al. | 709/206 |
| 6,172,141 B1 | * | 1/2001 | Wong et al. | 523/455 |
| 6,185,551 B1 | * | 2/2001 | Birrell et al. | 707/3 |
| 6,226,630 B1 | * | 5/2001 | Billmers | 707/3 |
| 6,513,045 B1 | * | 1/2003 | Casey et al. | 707/104.1 |
| 6,650,890 B1 | * | 11/2003 | Irlam et al. | 455/412.1 |
| 6,718,321 B1 | * | 4/2004 | Birrell et al. | 707/2 |
| 6,847,989 B1 | * | 1/2005 | Chastain et al. | 709/207 |
| 6,915,333 B1 | * | 7/2005 | Delia et al. | 709/206 |
| 2004/0148355 A1 | * | 7/2004 | Krause et al. | 709/206 |

* cited by examiner

*Primary Examiner*—Bharat Barot
*Assistant Examiner*—Asad Nawaz
(74) *Attorney, Agent, or Firm*—Peter F. Corless; Steven M. Jensen; Edwards Angell Palmer & Dodge LLP

(57) ABSTRACT

A system and a method for managing mails and files are proposed, which are applied to a network environment e.g. Internet, allowing received mails or files to be classified and systematically stored in a database, according to receiver's group, mail subject, file name and type, and/or sender's address. This therefore allows an authorized user to efficiently search mails or files from the database in response to receiver's group, mail subject, file name and type, and/or sender's address provided by the user, so that the desired mails or files can be quickly retrieved.

4 Claims, 8 Drawing Sheets

FIG. 7

| Subject | Sender | Mail name | Receiver's group | Mail directory |
|---|---|---|---|---|
| Private mail (Happy birthday) | Foreign mail (from:test.com) | 412 | 571-S1 | 572-paul |
| ..... | ..... | ..... | ..... | ..... |

FIG. 8

| File type | Sender | File name | Receiver's group | File directory |
|---|---|---|---|---|
| word(doc file) | Foreign file (from : test.com) | 402 (test.doc) | 571-S2 | 574-tar |
| ..... | ..... | ..... | ..... | ..... |

SYSTEM AND METHOD FOR MANAGING MAIL AND FILE

FIELD OF THE INVENTION

The present invention relates to systems and methods for managing mails and files, and more particularly, to a system and a method for managing mails and files, allowing an authorized user to inquire and retrieve mails or files that are securely and systematically managed and classified.

BACKGROUND OF THE INVENTION

Referring to FIG. 1, a first conventional mail management system 7 is connected to a second mail management system 9 via Internet 8. The first mail management system 7 has a mail server 71, and is associated with terminal devices 72, 73; similarly, the second mail management system 9 includes a mail server 91, and is connected with terminal devices 92, 93. The mail server 71 of the first mail management system 7 is assigned with a DNS (domain name system) address e.g. abc.com, and contains groups A and B of users. The group A members include Adam, Ken and Mary, with Adam being designated as a mail administrator, and Internet e-mail addresses for the group A members are Adam@abc.com, Ken@abc.com, and Mary@abc.com, respectively. The group B members include Roger, Jack and Ann, wherein Jack is a mail administrator, and their Internet e-mail addresses are Roger@abc.com, Jack@abc.com, and Ann@abc.com, respectively. Similarly, the mail server 91 of the second mail management system 9 is also provided with a DNS address, e.g. xyz.com. Users of the mail server 91 are assigned to groups X and Y, including Bryan, Mac and Tylor for the group X with Tylor being designated as a mail administrator, and Internet e-mail addresses for the group X members are Bryan@xyz.com, Mac@xyz.com, and Tylor@xyz.com, respectively. The group Y members include Nancy, Peter, and John, wherein Peter is a mail administrator, and their Internet e-mail addresses are Nancy@xyz.com, Peter@abc.com and John@abc.com, respectively.

When Mac at the terminal device 92 logins in the mail server 91, and desires to send a mail 911 to Ken who is a user of the mail server 71 of the first mail management system 7, first, Mac inputs Ken's e-mail address i.e. Ken@abc.com to a receiver field of the mail 911, and then sends the mail 911. Since Mac is a user member of the group X, the mail 911 would be firstly delivered to the group X of the mail server 91, and then forwarded by the mail administrator "Tylor" of the group X to the first mail management system 7 via Internet 8. Upon receipt of the mail 911, the email server 71 of the first mail management system 7 assigns the mail 911 to the group A, and the mail administrator "Adam" of the group A then forwards the mail 911 to Ken's mail directory, allowing Ken to login in the mail server 71 and retrieve the mail 911. Alternatively, if Ann at the terminal device 73 desires to send a mail to Nancy who is a user of the mail server 91 of the second mail management system 9, mail delivery is accomplished through similar procedures as mentioned above, and thus it is not further described herein.

However, the conventional mail management system can only assign received mails to corresponding receivers, but is not capable of classifying and storing the mails according to user name or user's group name, mail subject, and/or sender's address. In this case, if a user prefers to review a mail, it is hard to search and retrieve the particular mail since mails are messily stored without being classified.

Therefore, how to eliminate the foregoing drawbacks of the conventional mail management system, for allowing mails to be systematically classified and conveniently retrieved by a user, is a critical problem to solve.

SUMMARY OF THE INVENTION

A primary objective of the present invention is to provide a system and a method for managing mails and files, which are applied to a network environment, and store mails or files into a database in a manner that, the mails or files are classified according to user name or user's group name, sender's address, mail subject and/or file type, so as to allow an authorized user to inquire and retrieve desired mails or files from the database in facility with classified storage of mails or files.

In accordance with the foregoing and other objectives, the present invention proposes a system and a method for managing mails and files.

The method for managing mails and files of the invention adopts a system for managing mails and files and is applied in a network environment e.g. Internet, allowing received mails or files to be classified and stored according to mail subject or file name and sender's address, whereby mail or file search is efficiently conducted for retrieving inquired mails or files, wherein the managing system includes a receiving/transmitting module, a processing module, a mail converting module, an accessing module, and a storing module. The method comprises the steps of: (1) sending received mails or files via the receiving/transmitting module to the processing module; (2) transmitting the mails or files from the receiving/transmitting module to the mail converting module or the file converting module via the processing module, respectively; (3) classifying the mails via the mail converting module according to mail subject and/or sender's address, and forwarding the classified mails to the accessing module; or classifying the files via the file converting module according to file name and/or sender's address, and forwarding the classified files to the accessing module; (4) assigning and storing the mails via the accessing module into corresponding user groups of a mail database in the storing module, wherein receivers of the mails belongs to the user groups, whereby mail administrators of the user groups forward the mails to mail directories of the receivers, allowing the receivers to read the mails; or assigning and storing the files via the accessing module into corresponding user groups of a file database in the storing module, wherein receivers of the files belongs to the user groups, whereby file administrators of the user groups forward the files to file directories of the receivers, allowing the receivers to retrieve the files; (5) verifying authorization of a user who requests for searching a mail or file according to a user database of the storing module via the accessing module; and (6) searching via an index-searching module of the accessing module for a corresponding mail or file stored in the mail database or the file database of the storing module in response to user group, mail subject or file name, and/or sender's address provided by the user.

The system for managing mails and files of the invention comprises a receiving/transmitting module, a processing module, a mail converting module, a file converting module, an accessing module, and a storing module.

The receiving/transmitting module is used for receiving mails and files from Internet, and for transmitting mails and files from the mail converting module and the file converting module to Internet, wherein the received mails and files from Internet are further forwarded to the processing module by the receiving/transmitting module.

The processing module is used for separating the mails and files from the receiving/transmitting module, so as to transfer the mails to the mail converting module, and to transfer the files to the file converting module.

The mail converting module is used for classifying the mails from the processing module, according to mail subject and/or sender's address, wherein the classified mails are transmitted by the mail converting module to the accessing module.

The file converting module is used for classifying the files from the processing module, according to file name and/or sender's address, wherein the classified files are transmitted by the file converting module to the accessing module.

The accessing module is used for assigning and storing the mails from the mail converting module into corresponding user groups of a mail database in the storing module, wherein receivers of the mails belong to the user groups, whereby mail administrators of the user groups forward the mails to mail directories of the receivers, allowing the receivers to reads the mails. The accessing module further assigns and stores the files from the file converting module into corresponding user groups of a file database in the storing module, wherein receivers of the files belong to the user groups, whereby file administrators of the user groups forward the files to file directories of the receivers, allowing the receivers to retrieve the files Moreover, the accessing module verifies authorization of a user who requests for searching a mail or file, according to a user database of the storing module, allowing an index-searching module of the accessing module to search a corresponding mail or file stored in the mail database or the file database of the storing module in response to user group name, mail subject, file name and/or sender's address being provided from the user.

The storing module has the mail database, the user database and the file database. The mail database includes a plurality of user groups, and each of the user groups contains a plurality of mail directories for storing mails therein. The mail database further includes a mail index table, allowing a particular mail to be quickly searched out through the use of the mail index table. The user database is used for storing users' data, including user accounts, user authorization and personal information, allowing the accessing module to verify user authorization according to the user database. The file database includes a plurality of user groups, and each of the user groups contains a plurality of file directories for storing files therein. Further, the file database includes a file index table, allowing a particular file to be quickly searched out through the use of the file index table.

In the use of the system and method for managing mails and file of the invention, mails or files can be classified and categorized by the managing system, and systematically stored in a database, according to receiver's group, mail subject, file name and type, and/or sender's address. This therefore allows an authorized user to efficiently search a mail or file from the database in response to receiver's group, mail subject, file name and type, and/or sender's address provided by the user, so that the desired mail or file can be quickly retrieved.

BRIEF DESCRIPTION OF THE DRAWINGS

The present invention can be more fully understood by reading the following detailed description of the preferred embodiments, with reference made to the accompanying drawings, wherein:

FIG. 7 is a schematic diagram showing a mail index table for use in the method for managing mails and files of FIG. 5; and FIG. 8 is a schematic diagram showing a mail index table for use in the method for managing mails and files of FIG. 6.

DETAILED DESCRIPTION OF THE PREFERRED EMBODIMENTS

Figure 1:
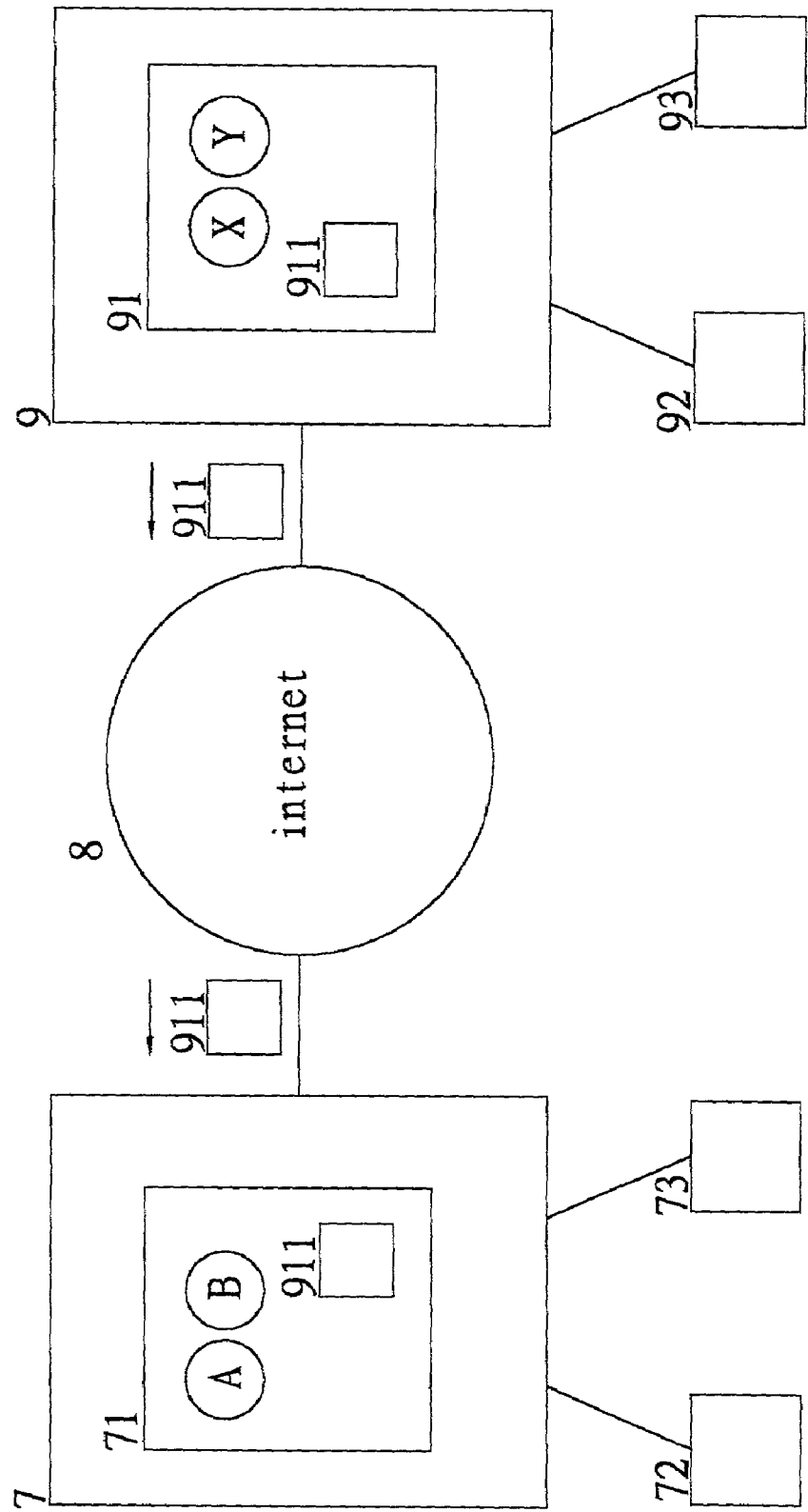
FIG. 1 (PRIOR ART) is a block schematic diagram showing basic architecture of a conventional mail management system.
Figure 2:
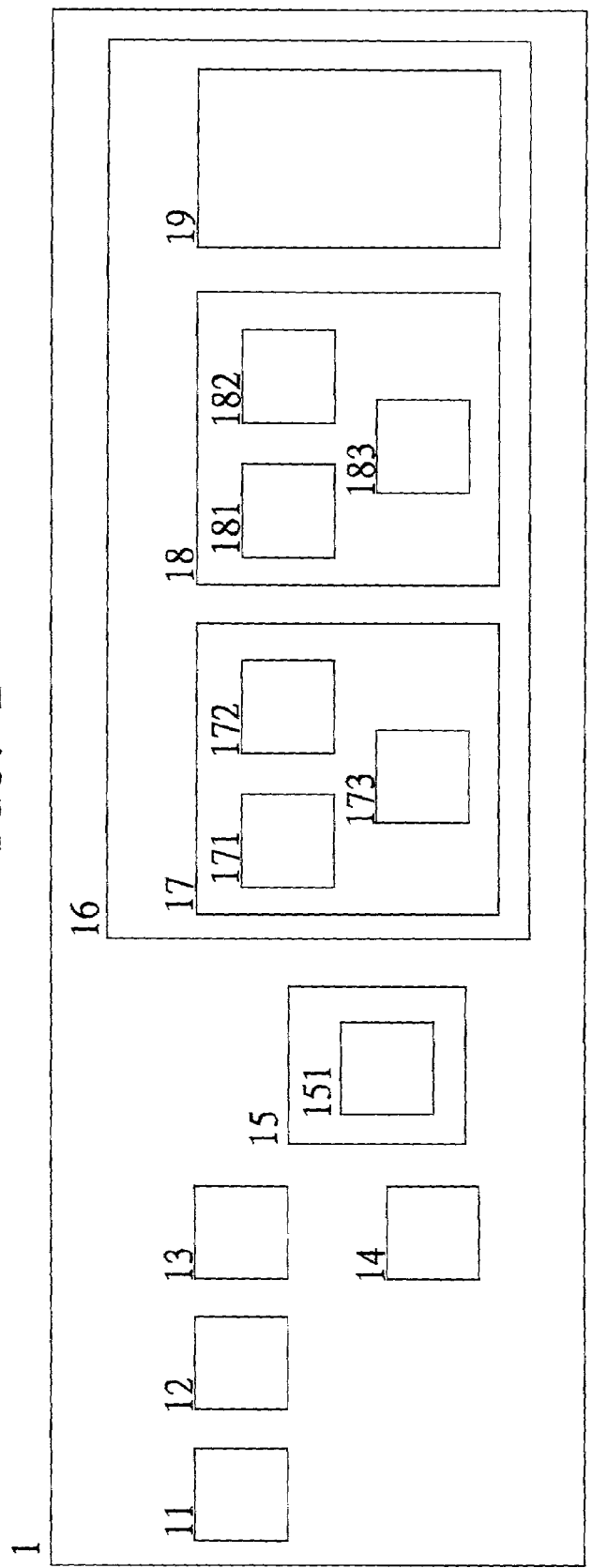
FIG. 2 is a block schematic diagram showing basic architecture of a preferred embodiment of a system for managing mails and files of the invention.

FIG. 2 illustrates basic architecture of a preferred embodiment of a system for managing mails and files of the invention. As shown in the drawing, the system for managing mails and files 1 of the invention comprises a receiving/transmitting module 11, a processing module 12, a mail converting module 13, a file converting module 14, an accessing module 15, and a storing module 16.

The receiving/transmitting module 11 is used for receiving mails or files from Internet, and transmitting mails or files from the mail converting module 13 or the file converting module 14 to Internet. In receipt of mails or files from Internet, the receiving/transmitting module 11 initiates the processing module 12, and transmits the mails or files to the processing module 12 for processing.

Upon receiving mails or files, the processing module 12 separates mails and files, so as to send the mails to the mail converting module 13 and the files to the file converting module 14 respectively.

The mail converting module 13 receives mails from the processing module 12, and classifies the mails according to mail subject and/or sender's address. For example, in respect of mail subject, mails can be classified into a private mail category and an advertising mail category; and/or in view of sender's address, mails can be assigned to a domestic mail category and a foreign mail category. A particular mail can belong to more than one category at the same time, e.g. a private and foreign mail. The mail converting module 13 then transmits classified mails to the accessing module 15.

As receiving files from the processing module 12, the file converting module 14 classifies the files according to file name and/or sender's address. For example, with respect to file name, files can be classified into a text file category and a picture file category; and/or in consideration of sender's address, files can be assigned to a domestic file category and a foreign file category. A particular file can belong to more than one category, e.g. a picture and domestic file. The file converting module 14 then transmits classified files to the accessing module 15.

After receiving classified mails, the accessing module 15 assigns and stores the mails into different groups 171 of a mail database 17 in the storing module 16, depending on the groups 171 to which the mail receivers belong. Thereafter, the mails can be forwarded by mail administrators of the groups 171 to corresponding mail directories 172 of the receivers, allowing users or receivers to retrieve mails from their mail directories 172. Similarly, for classified files, the accessing module 15 assigns and stores the mails into different groups 181 of a file database 18 in the storing module 16, depending on the groups 181 to which the file receivers belong. Then, file administrators of the groups 181 forward the file to corresponding file directories 182 of the receivers, whereby users or receivers can retrieve files from their file directories. In addition, the accessing module 15 also functions to examine user's authorization in a manner that, when a user requests for retrieving a mail or file, the accessing module 15 then verifies user's authorization according to a user database 19 of the storing module 16. Moreover, the accessing module 15 includes an index-searching module 151, which is used to process a request from a user for searching and retrieving a mail or file. In response to group name, mail subject, file name and/or sender's address inputted by the user, the index-searching module 15 searches in the mail database 17 or the file database 18 for a corresponding mail or file.

The storing module 16 includes the mail database 17, the user database 19 and the file database 18. The mail database 17 is composed of multiple groups 171, and each group 171 includes mail directories 172 of various users, with a plurality of mails being stored in each mail directory 172. Further, the mail database 17 is also provided with a mail index table 173 for storing index data of classified mails, whereby a particular mail can be quickly searched out through the use of the mail index table 173. Similarly, the file database 18 consists of multiple groups 181, and each group 181 includes file directories 182 of various users, with a plurality of files being stored in each file directory 182. The file database 18 also includes a file index table 183 for storing index data of classified files, allowing a particular file to be quickly searched out through the use of the file index table 183. In addition, the user database 19 contains user's data such as user's account, user's authorization and personal information, by which the accessing module 15 can verify the identity of a login user.

Figure 3:
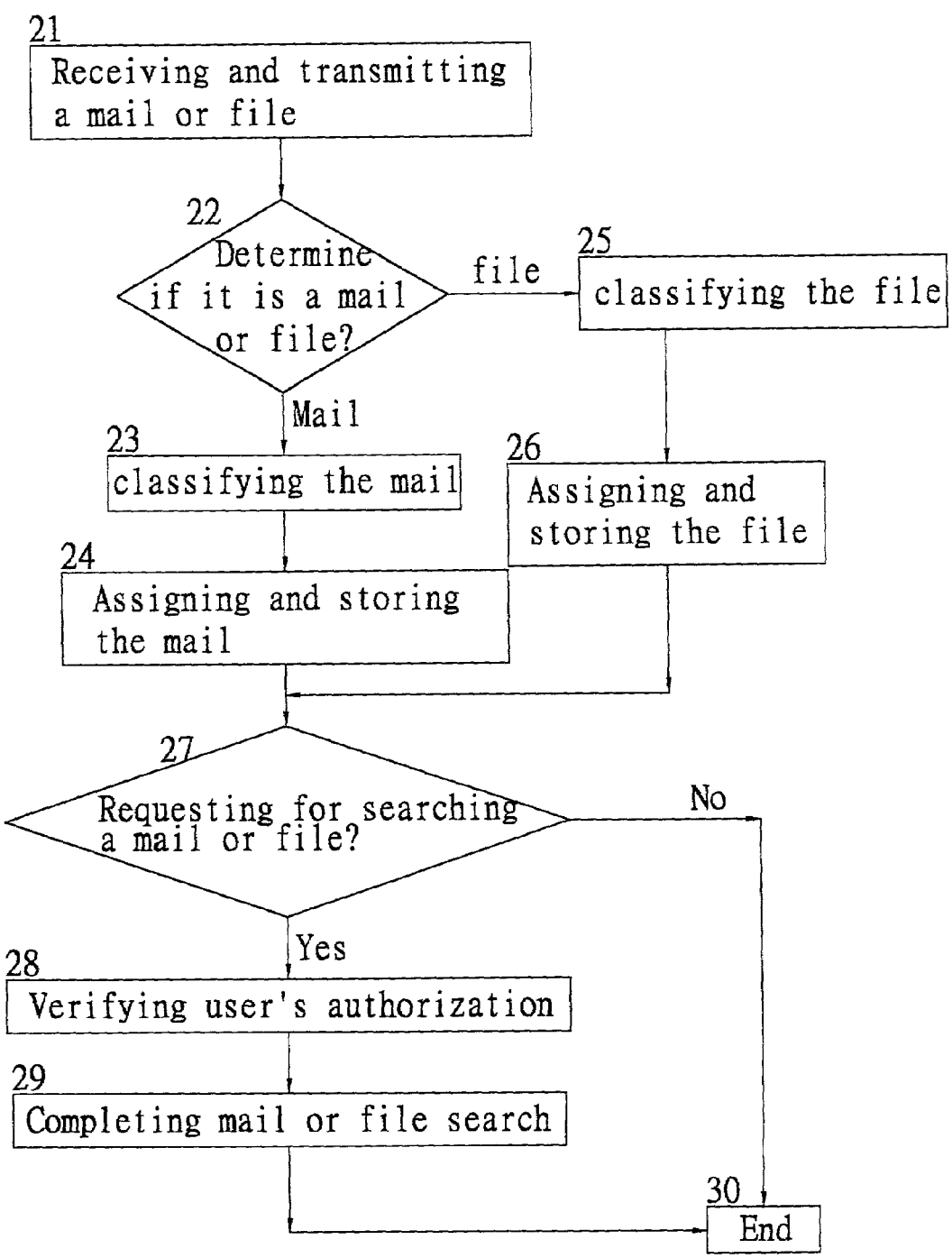
FIG. 3 is a schematic diagram showing the steps involved in a method for managing mails and files through the use of the system for managing mails and files in FIG. 2.

FIG. 3 illustrates a method for managing mails and files in the use of the system for managing mails and files in FIG. 2. As shown in the drawing, first in step 21, a receiving/transmitting module 11 of the system for managing mails and files 1 receives a mail or file, and then sent it to a processing module 12. Thereafter, step 22 is proceeded.

In step 22, the processing module 12 determines if it is a mail or file being sent from the receiving/transmitting module 11. If it is a mail, the mail is transmitted to a mail converting module 13, and then step 23 is proceeded. If it is a file, the file is forwarded to a file converting module 14, and then step 25 is proceeded.

In step 23, after receiving the mail, the mail converting module 13 classifies the mail according to mail subject and/or sender's address thereof. For example, in respect of mail subject, a mail can be categorized into a private mail or an advertising mail; in response to sender's address, a mail can be classified to a domestic mail or foreign mail. A particular mail can belong to more than one category, e.g. a private and domestic mail. The mail converting module 13 then sends the classified mail to an accessing module 15. Thereafter, step 24 is proceeded.

In step 24, upon receiving the classified mail, the accessing module 15 assigns and stores the mail into a corresponding group 171 of a mail database 17 in a storing module 16, according to a receiver of the mail who belongs to the group 171. Thereafter, the mail can be forwarded by a mail administrator of the group 171 to a mail directory 172 of the receiver, allowing the receiver to read the mail from the mail directory 172. Thereafter, step 27 is proceeded.

In step 25, after receiving the file, the file converting module 14 classifies the file according to file name and/or sender's address thereof. For example, in respect of file name, a file can be categorized into a text file or a picture file; in response to sender's address, a file can be classified to a domestic file or foreign file. A particular file can belong to more than one category, e.g. a picture and domestic file. The file converting module 14 then sends the classified file to the accessing module 15. Thereafter, step 26 is proceeded.

In step 26, after receiving the classified file, the accessing module 15 assigns and stores the file into a corresponding group 181 of a file database 18 in the storing module 16, according to a receiver of the file who belongs to the group 181. Thereafter, the file can be forwarded by a file administrator of the group 181 to a file directory 182 of the receiver, allowing the receiver to read the file from the file directory 182. Thereafter, step 27 is proceeded.

In step 27, it determines if a user requests for searching a mail or file. If a searching request is generated, then step 28 is proceeded; or otherwise, step 30 is proceeded.

In step 28, the accessing module 15 verifies user's authorization. When a user requests for searching and retrieving a mail or file, the accessing module 15 examines the user's authorization according to a user database 19 of the storing module 16. Thereafter, step 29 is proceeded.

In step 29, after the user's authorization is verified, an index-searching module 151 of the accessing module 15 searches a corresponding mail or file from the mail database 17 or the file database 18 of the storing module 16 according to group name, mail subject, file name and/or sender's address provided from the user. Thereafter, step 30 is proceeded.

In step 30, the process for managing a mail or file is ended.

Figure 4:
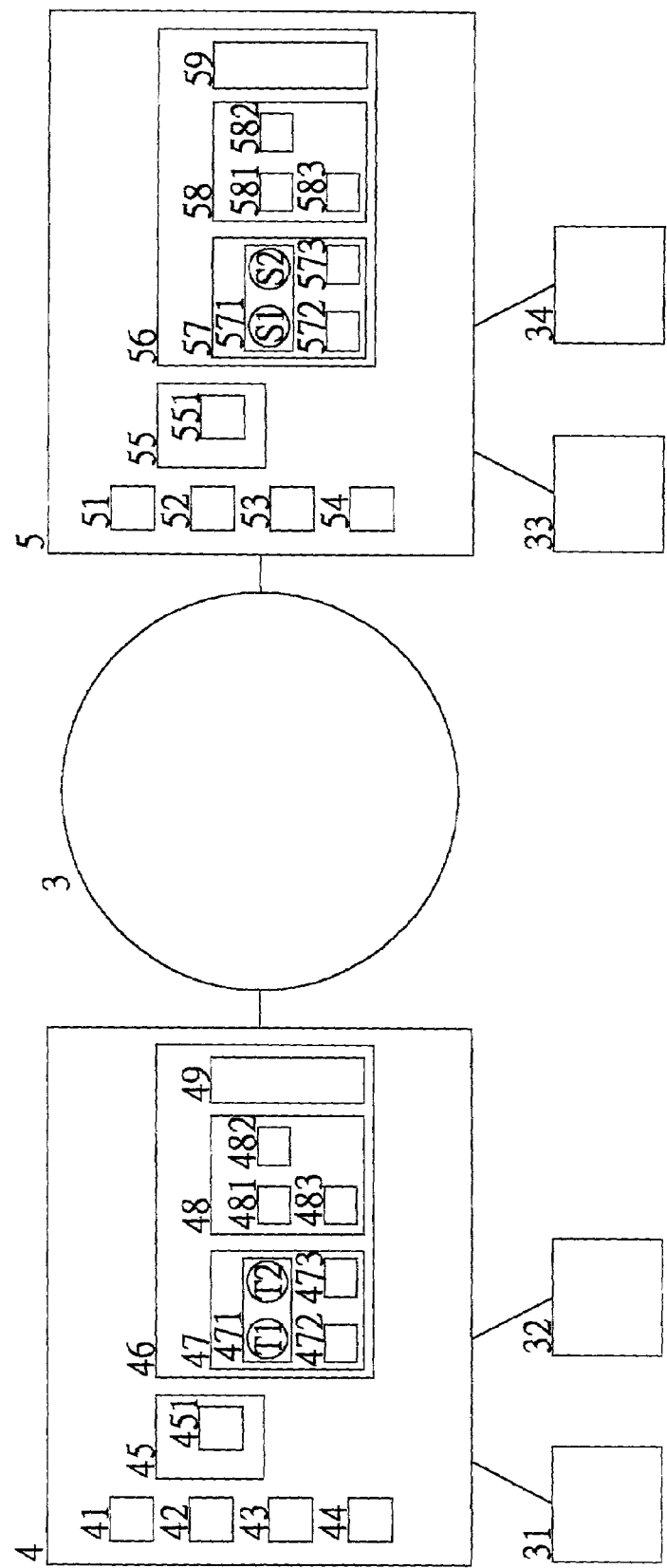
FIG. 4 is a block schematic diagram showing connection of the systems for managing mails and files of FIG. 2 with Internet for proceeding mail and file management.

FIG. 4 illustrates connection of the systems for managing mails and files of FIG. 2 with Internet for proceeding mail and file management. As shown in the drawing, systems for managing mails and files 4, 5, same as the system for managing mails and files in FIG. 2, are adopted and interconnected via Internet 3, wherein the managing system 4 is associated with terminal devices 31, 32, and the managing system 5 is associated with terminal devices 33, 34.

The managing system 4 is designated with a DNS (domain name system) address as test.com, and has a storing module 46 including a mail database 47, in which a group 471 thereof is provided with user groups T1 and T2. Members of the user group T1 include Ron and Pam, wherein Pam is a mail administrator, and their e-mail addresses are respectively Ron@test.com and Pam@test.com. Members of the user group T2 include Joe and Jane, wherein Jane is a mail administrator, and their e-mail addresses are respectively Joe@test.com and Jane@test.com.

The managing system 5 has a DNS address as try.com, and has a storing module 56 including a mail database 57, in which a group 571 thereof is provided with user groups S1 and S2. The user group S1 members include Paul and Steve, wherein Steve is a mail administrator, and their e-mail addresses are respectively Paul@try.com and Steve@try.com. The user group S2 only includes Tar, who is also a mail administrator and whose e-mail address is Tar@try.com.

Figure 5:
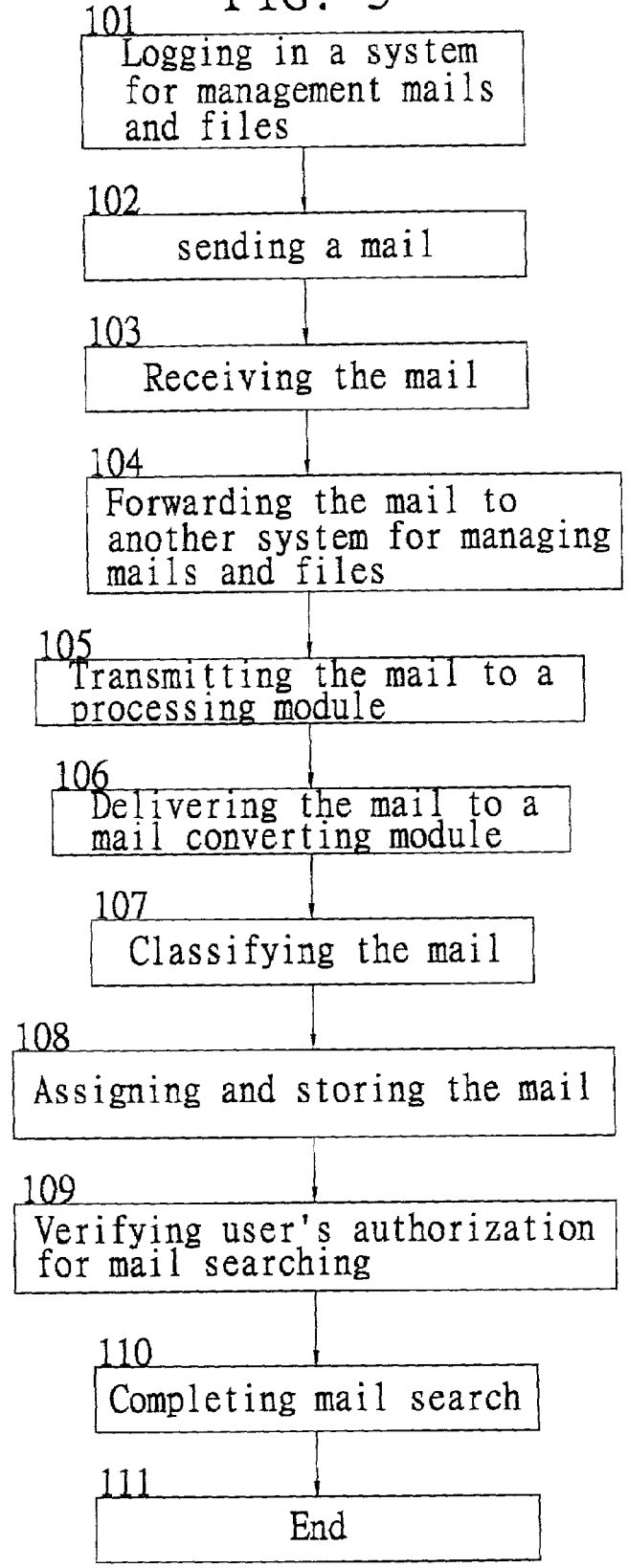
FIG. 5 is a schematic diagram showing a process for proceeding a method for managing mails and files in the use of the system for managing mails and files in FIG. 4.

FIG. 5 illustrates a process for proceeding a method for managing mails and files in the use of the systems for managing mails and files in FIG. 4. In step 101, if a user Ron at a terminal device 31 desires to log in a system for managing mails and files 4, a accessing module 45 of the managing system 4 examines Ron's authorization according to a user database 49 of a storing module 46. Thereafter, step 102 is proceeded.

In step 102, after Ron's authorization is verified for logging in the managing system 4, for sending a mail 411 to Paul, who belongs to a user group S1 of a system for managing mails and files 5, Ron needs to input Paul's e-mail address i.e. Paul@try.com to a field of receiver's internet e-mail address in the mail 411, with a subject of the mail 411 being filled as e.g. a message "Happy birthday", and with sender's address of the mail 411 being filled as Ron's address i.e. Ron@test.com. Then, the mail 411 is sent to a mail converting module 43, and step 103 is proceeded.

In step 103, the mail converting module 43 forwards the mail 411 to a receiving/transmitting module 41. Thereafter, step 104 is proceeded.

In step 104, the receiving/transmitting module 41 transmits the mail 411 to the managing system 5 via Internet 3. Thereafter, step 105 is proceeded.

In step 105, after receiving the mail 411, a receiving/transmitting module of the managing system 5 the mail 411 delivers the mail 411 to a processing module 52. Thereafter, step 106 is proceeded.

In step 106, the processing module 52 further checks the identity of the mail 411 from the receiving/transmitting module 51, and sends it to a mail converting module 53. Thereafter, step 107 is proceeded.

In step 107, after receiving the mail 411, the mail converting module 53 classifies it according to mail subject and/or sender's address. For example, the mail 411 with a subject of "Happy Birthday" is categorized as a private mail, and since a sender's address of "Ron@test.com" of the mail 411 is recognized as a foreign DNS address, the mail 411 belongs to a foreign mail. After classification, the mail 411 is converted to a private and foreign mail 412, which is then sent to an accessing module 55 by the mail converting module 53. Thereafter, step 108 is proceeded.

In step 108, the accessing module 55 stores the mail 412 into a user group S1 of a group 571 in a mail database 57, wherein a receiver (i.e. Paul) of the mail 412 belongs to the user group S1. Then, Steve who is a mail administrator of the user groups S1, assigns the mail 412 to a mail directory 572 of Paul, allowing Paul to read the mail 412 from the mail directory 572. Also, the accessing module 55 stores index data of the mail 412, including mail subject as "private mail", sender's address as "foreign mail" and sender's name as "Paul", into a mail index table 573. Thereafter, step 109 is proceeded.

In step 109, when Steve requests for searching a mail 412, the accessing module 55 examines Steve's authorization according to the user database 59 of the storing module 56. Thereafter, step 110 is proceeded.

In step 110, after Steve is verified to be the mail administrator of the user group S1, an index-searching module 551 of the accessing module 55 searches in the mail database 57 of the storing module 56 for a corresponding mail in response to user group as "S1", mail subject as "private mail", and/or sender's address "foreign mail" provided by Steve, so as to retrieve the mail 412 that is stored in the mail directory 572 and sent from Paul. Thereafter, step 111 is proceeded.

In step 111, the process for managing a mail is ended.

Figure 6:
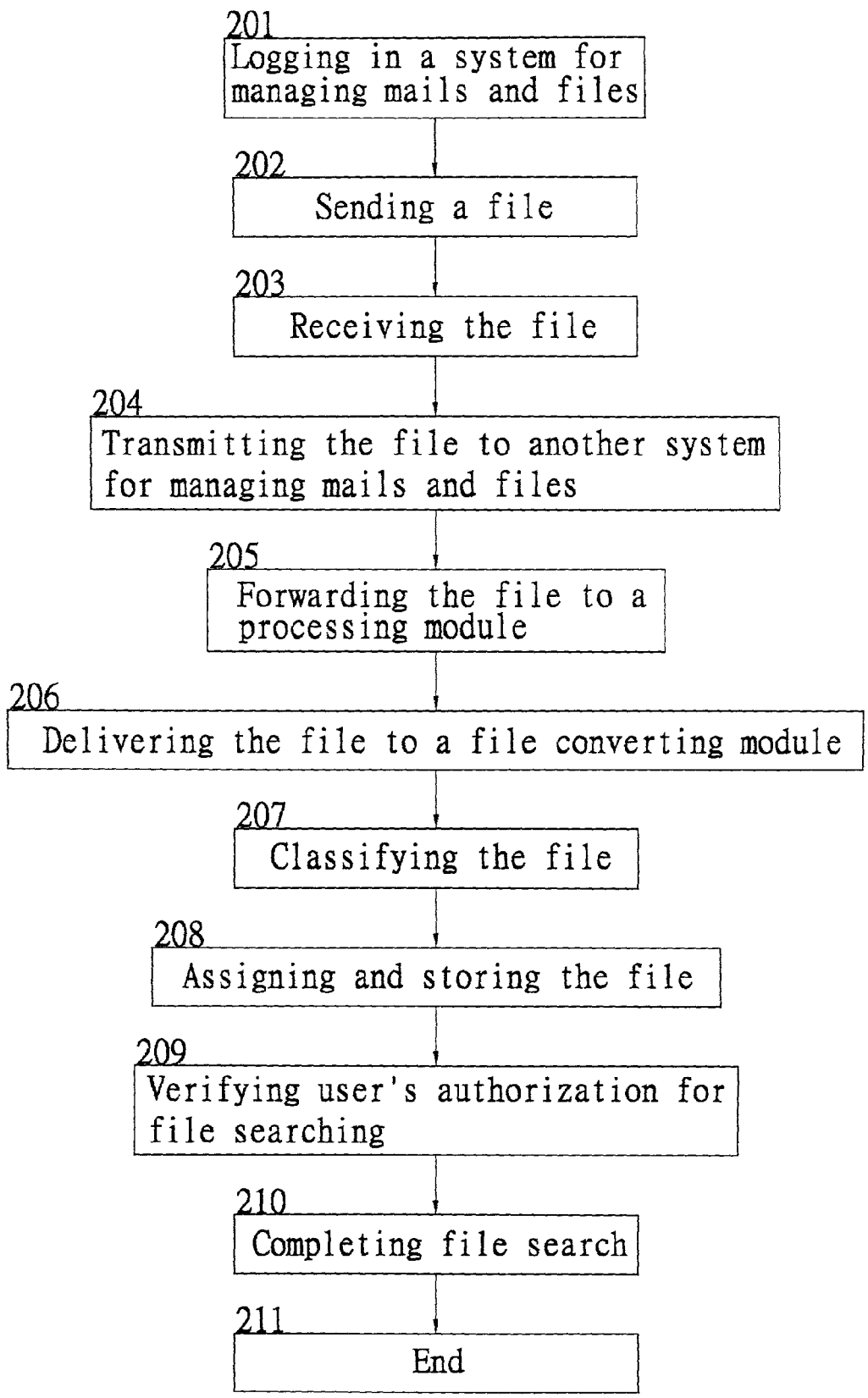
FIG. 6 is a schematic diagram showing another process for proceeding a method for managing mails and files in the use of the systems for managing mails and files in FIG. 4.

FIG. 6 illustrates another process for proceeding a method for managing mails and files in the use of the systems for managing mails and files in FIG. 4. In step 201, when a user Jane at a terminal device 32 desires to log in a system for managing mails and files 4, an accessing module 45 of the managing system 4 examines Jane's user account and authorization according to a user database 49 of a storing module 46. Thereafter, step 202 is proceeded.

In step 202, after Jane logs in the managing system 4 and prepares to send a file 401 to Tar, who belongs to a user group S2 of a system for managing mails and files 5, Jane needs to input a receiver's DNS address as "try.com", a receiver's group as "the user group S2 of a group 571" and a receiver's name as "Tar" to the file 401, and transmit the file 401 to a mail converting module 43, wherein the file 401 is a Word file in doc format with a file name of "test.doc". Thereafter, step 203 is proceeded.

In step 203, the mail converting module 43 sends the file 401 to a receiving/transmitting module 41. Thereafter, step 204 is proceeded.

In step 204, the receiving/transmitting module 41 forwards the file 401 to the managing system 5 via Internet 3. Thereafter, step 205 is proceeded.

In step 205, after receiving the file 401, a receiving/transmitting module 51 of the managing system 5 delivers the file 401 to a processing module 52. Thereafter, step 206 is proceeded.

In step 206, the processing module 52 further checks the identity of the file 401 from the receiving/transmitting module 51, and sends the file 401 to a file converting module 54. Thereafter, step 207 is proceeded.

In step 207, upon receiving the file 401, the file converting module 54 classifies the file 401 according to file name and/or sender's address. For example, the file 401 with a file name "test.doc" is assigned to be a Word file, and its sender's address "test.com" is a foreign DNS address, so that the file 401 belongs to a foreign file. After classification, the file 401 is converted into a Word and foreign file 402. Then, the file converting module 54 transfers the file 402 to an accessing module 55. Thereafter, step 208 is proceeded.

In step 208, in receipt of the file 402, the accessing module 55 assigns and stores the file 402 into the user group S2 of the group 571 in a file database 57, wherein the receiver (i.e. Tar) of the file 402 belongs to the user group S2. Then, a file administrator (i.e. Tar) of the user group S2 forwards the file 402 to a file directory 574 of Tar, allowing Tar to read the file 402 from the file directory 574. Also, the accessing module 55 stores index data of the file 402, including file type as "Word file", sender's address as "foreign file" and receiver as "Tar", into a file index table 575. Thereafter, step 209 is proceeded.

In step 209, when Tar requests for search a file 402, the accessing module 55 examines Tar's authorization according to the user database 59 of the storing module 56. Thereafter, step 210 is proceeded.

In step 210, after Tar is verified as the file administrator of the user group S2, an index-searching module 551 of the accessing module 55 search in the file database 57 of the storing module 56 for a corresponding file in response to user group as "S2", file type as "Word file", and/or sender's address "foreign mail" provided by Tar, so as to retrieve the file 402 that is stored in the file directory 574 and sent from Jane. Thereafter, step 211 is proceeded.

In step 211, the process for managing a file is ended.

FIG. 7 illustrates a mail index table for use in the method for managing mails and files of FIG. 5. As shown in the drawing, the mail index table 573 is composed of a plurality of fields, such as mail subject, sender's address, mail name, mail name, receiver's group, and mail directory. For example, index data of the foregoing mail 412 to be stored in the mail index table 573 include: mail subject as "private mail (Happy Birthday)", sender's address as "foreign mail (from: test.com)", mail name as "412", receiver's group as "571-S1", and mail directory as "572-Paul".

FIG. 8 illustrates a file index table for use in the method for managing mails and files of FIG. 6. As shown, the file index table 575 is composed of a plurality of fields, such as file type, sender's address, file name, receiver's group, and file directory. For example, index data of the foregoing file 402 to be stored in the file index table 575 include: file type as "Word (doc file)", sender's address as "foreign file (from: "test.com")", file name as "402 (test.doc)", receiver's group as "571-S2", and file directory as "574-Tar".

In conclusion, the invention has the following advantages. In the use of the system and method for managing mails and file of the invention, mails or files can be classified and categorized by the managing system, and systematically stored in a database, according to receiver's group, mail subject, file name and type, and/or sender's address. This therefore allows an authorized user to efficiently search mails or files from the database in response to receiver's group, mail subject, file name and type, and/or sender's address provided by the user, so that the desired mails or files can be quickly retrieved.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for managing mails and files, for use with a system for managing mails and files in a network environment, allowing received mails and files to be classified and stored according to mail subject, file name, and sender's address, wherein mail and file search is efficiently conducted for retrieving inquired mails, wherein the managing system includes a receiving/transmitting module, a processing module, a mail converting module, a file converting module, an accessing module, and a storing module; the method comprising the steps of:

(1) sending received mails and files via the receiving/transmitting module to the processing module;

(2) separating the mails and files from the receiving/transmitting module, so as to transfer the mails and files to the mail converting module and the file converting module, respectively, via the processing module;

(3) classifying the mails via the mail converting module according to mail subject and/or sender's address, and forwarding the classified mails to the accessing module; and (4) classifying the files via the file converting module according to file name and/or sender's address and forwarding the classified tiles to the accessing module; and (5) assigning and storing the mails via the accessing module into corresponding user groups of a mail database in the storing module, wherein receivers of the mails belong to the user groups, wherein mail administrators of the user groups forward the mails to mail directories of the receivers, allowing the receivers to read the mails the accessing module further for assigning and storing the files from the file converting module into corresponding user groups of a file database in the storing module wherein receivers of the files belong to the user groups wherein file administrators of the user groups forward the files to file directories of the receivers allowing the receivers to retrieve the files; the accessing module further for verifying authorization of a user who requests for searching a mail or file, according to a user database of the storing module, allowing an index-searching module of the accessing module to search a corresponding mail or file stored in the mail database or the file database of the storing module in response to user group name, mail subject. file name and/or sender's address being provided from the user.

2. The method of claim 1, wherein the network environment is Internet.

3. A system for managing mails and files, for use in a network environment, allowing received mails and files to be classified and stored according to mail subject or file name and sender's address, wherein mail and file search is efficiently conducted for retrieving inquired mails and files; the system comprising:

a receiving/transmitting module for receiving mails and files from the network environment, and for transmitting mails and files from a mail converting module and a file converting module to the network environment, wherein the received mails and files from the network environment are further forwarded to a processing module by the receiving/transmitting module;

the processing module for separating the mails and files from the receiving/transmitting module, so as to transfer the mails to the mail converting module, and jo transfer the tiles to the file converting module;

the mail converting module for classifying the mails from the processing module, according to mail subject and/or sender's address, wherein the classified mails are transmitted by the mail converting module to an accessing module;

the file converting module for classifying the files from the processing module, according to file name and/or sender's address, wherein the classified files are transmitted by the file converting module to the accessing module;

the accessing module for assigning and storing the mails from the mail converting module into corresponding user groups of a mail database in a storing module, wherein receivers of the mails belong to the user groups, whefeby wherein mail administrators of the user groups forward the mails to mail directories of the receivers, allowing the receivers to ieads read the mails; the accessing module further for assigning and storing the files from the file converting module into corresponding user groups of a file database in the storing module, wherein receivers of the files belong to the user groups, whefeby wherein file administrators of the user groups forward the files to file directories of the receivers, allowing the receivers to retrieve the files; the accessing module further for verifying authorization of a user who requests for searching a mail or file, according to a user database of the storing module, allowing an index-searching module of the accessing module to search a corresponding mail or file stored in the mail database or the file database of the storing module in response to user group name, mail subject, file name and/or sender's address being provided from the user;

and the storing module having the mail database, the user database and the file database; the mail database including a plurality of user groups, and each of the user groups containing a plurality of mail directories for storing mails therein; the mail database further including a mail index table, allowing a particular mail to be quickly searched out through the use of the mail index table; the user database for storing users' data, including user accounts, user authorization and personal information, allowing the accessing module to verify user authorization according to the user database; the file database including a plurality of user groups, and each of the user groups containing a plurality of file directories for storing files therein; the file database further including a file index table, allowing a particular file to be quickly searched out through the use of the file index table.

4. The system of claim 3, wherein the network environment is Internet.

\* \* \* \* \*